(12) United States Patent
Yona

(10) Patent No.: US 11,632,933 B1
(45) Date of Patent: Apr. 25, 2023

(54) DISPOSABLE PET TRAY INCLUDING A PET MATERIAL

(71) Applicant: Kelly Yona, Geneva (CH)

(72) Inventor: Kelly Yona, Geneva (CH)

( * ) Notice: Subject to any disclaimer, the term of this patent is extended or adjusted under 35 U.S.C. 154(b) by 0 days.

(21) Appl. No.: 17/692,472

(22) Filed: Mar. 11, 2022

(51) Int. Cl.
  *A01K 1/01* (2006.01)
  *A01K 1/015* (2006.01)
(52) U.S. Cl.
  CPC .......... *A01K 1/0107* (2013.01); *A01K 1/0152* (2013.01)
(58) Field of Classification Search
  CPC .... A01K 1/0107; A01K 1/0152; A01K 1/015; A01K 1/0154; A01K 1/0157
  See application file for complete search history.

(56) References Cited

U.S. PATENT DOCUMENTS

| 3,626,899 | A | * | 12/1971 | Spellman | A01K 15/02 119/169 |
| 4,800,677 | A | * | 1/1989 | Mack | A01K 1/0107 294/1.3 |
| 4,800,841 | A | * | 1/1989 | Yananton | A01K 1/0125 119/168 |
| 4,934,316 | A | * | 6/1990 | Mack | A01K 1/0107 119/169 |
| 5,482,007 | A | | 1/1996 | Kumlin | |
| 5,832,869 | A | * | 11/1998 | Franczak | A01K 1/0107 119/168 |
| 7,249,570 | B1 | * | 7/2007 | Roberson | A01K 1/0157 119/169 |
| 2005/0166856 | A1 | * | 8/2005 | Kaneko | A01K 1/0107 119/169 |
| 2006/0200105 | A1 | * | 9/2006 | Takahashi | A01K 1/0107 604/360 |
| 2007/0266953 | A1 | | 11/2007 | Zoller et al. | |
| 2008/0083376 | A1 | * | 4/2008 | Hurwitz | A01K 1/0107 119/167 |
| 2008/0236504 | A1 | * | 10/2008 | Silverman | A01K 1/0107 119/169 |
| 2009/0314214 | A1 | | 12/2009 | Miller | |
| 2010/0012043 | A1 | | 1/2010 | Wenzel | |
| 2011/0146581 | A1 | * | 6/2011 | Sasano | A01K 1/0157 119/171 |
| 2012/0132147 | A1 | * | 5/2012 | Cheng | A01K 1/0107 119/161 |

(Continued)

FOREIGN PATENT DOCUMENTS

WO     2018104550     6/2018

*Primary Examiner* — Trinh T Nguyen
(74) *Attorney, Agent, or Firm* — The Concept Law Group, PA; Robert C. Kain; Scott M. Garrett

(57) ABSTRACT

A disposable pet litter tray is formed by a sheet member that defines end wall portions and side wall portions around a floor portion. A layer of pet material is disposed on the floor portion and covered with a retaining film or equivalent layer of material that is adhered to the floor portion around the layer of pet material. The end wall and side wall portions can be folded over the floor portion and pet material, and the assembly can then be rolled up for travel, storage, sale, and/or shipping, prior to use. To use the disposable pet tray, the assembly is unrolled, and the end wall and wall portions are then raised to be substantially perpendicular to the plane of the floor portion. Then the retaining film can be removed to allow access to the pet material by a pet.

12 Claims, 16 Drawing Sheets

(56) References Cited

U.S. PATENT DOCUMENTS

| | | | |
|---|---|---|---|
| 2014/0261208 A1* | 9/2014 | Calimano | A01K 1/0107 |
| | | | 119/161 |
| 2019/0274275 A1* | 9/2019 | Sutherland | B31D 5/04 |
| 2020/0079577 A1* | 3/2020 | Ngo | B65D 83/0835 |
| 2020/0296918 A1* | 9/2020 | Axelrod | B32B 27/308 |

* cited by examiner

DISPOSABLE PET TRAY INCLUDING A PET MATERIAL

FIELD OF THE INVENTION

The present invention relates generally to disposable container for pet materials, and, more particularly, relates to a disposable pet tray including a sheet with a layer of pet material retained on a surface of the sheet, and which is provided in a rolled form which can be unrolled for use.

BACKGROUND OF THE INVENTION

Pet litter trays are in widespread use and come in a variety of formats and configurations. A simple pet litter tray be simply be a plastic tub in which pet litter is placed for use by a pet (e.g. cats), and then the used pet litter and pet waste can be removed from the tray and replaced with fresh, clean pet litter. For pet litter containers that are intended to be used repeatedly, there can be any number of enhancements built into the structure, such as raised or elevated openings to reduce the amount of tracking pet litter outside of the container by the pet upon leaving the container. There are auto-cleaning containers that rake the pet litter after use by a pet to collect waste and clumped pet litter.

However, such sophisticated pet litter containers are not suitable for certain applications. For example, it is common for people to travel with their pet, and packing a full sized litter tray or container is not practical as it is heavy, voluminous, and cumbersome, especially if one wants to take her pet for a quick week end somewhere. In kennel or shelter operations, where animals are housed in separate pens where space is limited, the more permanent large pet litter trays and containers are not practical. There are smaller, limited use pet litter trays available, but these are provided as unfolded cartons that users assemble, and then place litter into for use. The cartons, however, occupy a substantial area, which effectively occupies a larger space than is really needed to store them.

Similarly, the same is generally true for pet food. Dry pet food is typically provided in bulk bags, and wet food is provided in cans or pouches, neither of which generally act well as a dish or bowl from which a pet can safely eat. A can, for example, can have sharp edges that may result in cuts on the pet's mouth/tongue. Carrying a bowl or dish for a pet can be inconvenient, and in the case of caring for many animals, the washing of bowls can be a tedious chose.

Therefore, a need exists to overcome the problems with the prior art as discussed above.

SUMMARY OF THE INVENTION

In accordance with some embodiment of the inventive disclosure, there is provided a disposable pet tray that includes a sheet member having a first end wall portion defined at a first end of the sheet member, a second end wall portion defined at a second end of the sheet member opposite the first end, a first sidewall portion defined along a first side of the sheet member from the first end to the second end of the sheet member, a second sidewall portion defined along a second side of the sheet member, opposite the first side, and from the first end to the second end of the sheet member, and a floor portion that is bounded by the first end wall, second end wall, first sidewall, and second sidewall. The disposable pet tray further includes a layer of pet material disposed on a top surface of the sheet member and on the floor portion, a retention film disposed over the layer of pet material and adhered to the sheet member on the floor portion around the layer of pet material to retain the layer of pet material in place on the floor portion. When in a stored position before use, the sheet member is configured in a roll with the layer of pet material and retention film in a spiral, wherein the first end is at an interior of the roll and the second end is on an exterior of the roll. In a use configuration, the roll is unrolled such that the floor portion is flat, and the first end wall, second end wall, first side wall, and second sidewall are each raised at substantially a right angle to the floor portion.

In accordance with a further feature, the sheet member is comprised of paper stock coated with a layer of polylactic acid on top surface of the sheet member against which the pet material is held.

In accordance with a further feature, the layer of pet material is divided into at least two portions, the retention film is adhered to the sheet member between the at least two portions.

In accordance with a further feature, the retention film is further adhered to the sheet member at a plurality of holes in the layer of pet material.

In accordance with a further feature, the first end wall portion is defined a first end crease across the sheet member parallel with and proximate to the first end, the second end wall portion is defined a second end crease across the sheet member parallel with and proximate to the second end, the first sidewall portion is defined a first side crease across the sheet member parallel with and proximate to the first side, and the second sidewall portion is defined a second side crease across the sheet member parallel with and proximate to the second side.

In accordance with a further feature, the first end wall portion is defined a first end score line across the sheet member parallel with and proximate to the first end, the second end wall portion is defined a second end score line across the sheet member parallel with and proximate to the second end, the first sidewall portion is defined a first side score line across the sheet member parallel with and proximate to the first side, and the second sidewall portion is defined a second side score line across the sheet member parallel with and proximate to the second side.

In accordance with a further feature, the first and second sidewall portions intersect with first end wall portion at the first end and the second end wall portion at the second end at corners of the sheet member to define tab portions at the first end and the second that connect the first and second sidewall portions to the first and second end wall portions when the disposable pet tray is in the use configuration.

In accordance with a further feature, the disposable pet tray further includes a first adhesive portion proximate to the first end on a bottom surface of the floor portion, a first removable liner disposed over the first adhesive portion, a second adhesive portion proximate to the second end on the bottom surface of the floor portion, a second removable liner disposed over the second adhesive portion.

In accordance with a further feature, the first and second sidewall portions intersect with first end wall portion at the first end and the second end wall portion at the second end at corner sections of the sheet member, and wherein each of the corner sections are crimped in an alternating pattern.

In accordance with a further feature, the layer of pet material is one of pet litter or pet food.

In accordance with some embodiments of the inventive disclosure, there is provided a method that includes providing a disposable pet tray having a sheet member including a first end wall portion defined at a first end of the sheet member, and a second end wall portion defined at a second end of the sheet member opposite the first end, a first sidewall portion defined along a first side of the sheet member from the first end to the second end of the sheet member, and a second sidewall portion defined along a second side of the sheet member, opposite the first side, and from the first end to the second end of the sheet member, a floor portion that is bounded by the first end wall, second end wall, first sidewall, and second sidewall, a layer of pet material disposed on a top surface of the sheet member and on the floor portion, and a retention film disposed over the layer of pet material and adhered to the sheet member on the floor portion around the layer of pet material to retain the layer of pet material in place on the floor portion. The method further includes rolling the sheet member into a roll with the layer of pet material and retention film in a spiral, wherein the first end is at an interior of the roll and the second end is on an exterior of the roll.

In accordance with a further feature, the method further includes, subsequent to rolling the sheet member, unrolling the roll such that the floor portion is flat, raising each of the first end wall, second end wall, first side wall, and second sidewall at substantially a right angle to the floor portion.

In accordance with a further feature, providing the sheet member comprises providing a sheet member of paper stock coated with a layer of polylactic acid on the top surface of the sheet member.

In accordance with a further feature, providing the layer of pet material comprises providing the layer of pet material divided into at least two portions, and providing the retention film comprises providing the retention film further adhered to the sheet member between the at least two portions of the layer of pet material.

In accordance with a further feature, providing the retention film comprises providing the retention film further adhered to the sheet member at a plurality of holes in the layer of pet material.

In accordance with a further feature, providing the sheet member further includes providing a first end crease across the sheet member parallel with and proximate to the first end to define the first end portion, providing a second end crease across the sheet member parallel with and proximate to the second end to define the second end portion, providing a first side crease across the sheet member parallel with and proximate to the first side to define the first side portion, and providing a second side crease across the sheet member parallel with and proximate to the second side to define the second side portion.

In accordance with a further feature, providing the sheet member further includes providing a first end score line across the sheet member parallel with and proximate to the first end to define the first end portion, providing a second end score line across the sheet member parallel with and proximate to the second end to define the second end portion, providing a first side score line across the sheet member parallel with and proximate to the first side to define the first side portion, and providing a second side score line across the sheet member parallel with and proximate to the second side to define the second side portion.

In accordance with a further feature, the first and second sidewall portions intersect with first end wall portion at the first end and the second end wall portion at the second end at corners of the sheet member to define tab portions at the first end and the second that connect the first and second sidewall portions to the first and second end wall portions when the disposable pet tray is in the use configuration.

In accordance with a further feature, the first and second sidewall portions intersect with first end wall portion at the first end and the second end wall portion at the second end at corner sections of the sheet member, and wherein each of the corner sections are crimped in an alternating pattern.

In accordance with a further feature, the layer of pet material is one of pet litter or pet food.

Although the invention is illustrated and described herein as embodied in a disposable pet tray, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

"In the description of the embodiments of the present invention, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes, and cannot be construed as indicating or implying relative importance.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the element being described. Those skilled in the art can understand the specific meanings of the above-mentioned terms in the embodiments of the present invention according to the specific circumstances.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
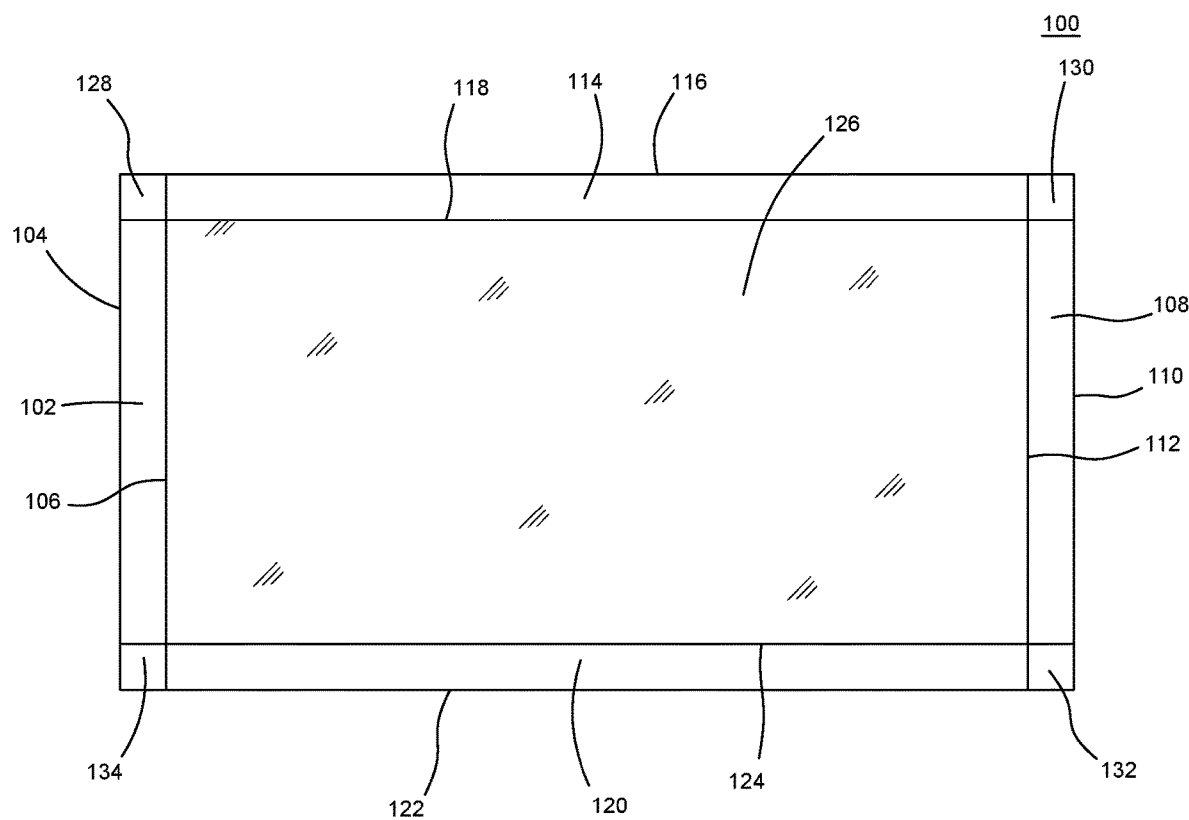
FIG. 1 is an overhead plan view of a sheet member for a disposable pet tray, in accordance with some embodiments.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

FIG. 1 is an overhead plan view of a sheet member 100 for a disposable pet tray, in accordance with some embodiments. The sheet member is a flat article that can be made generally of a paper or cardstock material. The material of the sheet member can be made from recycled materials and can be formed to be biodegradable. The sheet member has two major opposing surfaces such as a top major surface and a bottom major surface, and edges around the perimeter of the sheet member 100. The sheet member 100 includes a first end wall portion 102 defined between the first end 104 of the sheet member and a first end line 106, a second end wall portion 108 defined between the second end 110 of the sheet member, that is opposite the first end 104, and a second end line 112. Further, there is a first sidewall portion 114 defined between the first side 116 and a first side line 118, and a second sidewall portion 120 defined between the second side 122, that is opposite the first side 116, and a second side line 124. As used here, there first and second ends 104, 110 simply refer to opposing edges of the sheet member 100, and likewise the first and second sides 116, 122 refer to opposing edges of the sheet member 100. The first end line 106, second end line 112, first side line 118, and second end line 124 indicate where the sheet member 100 is folded, thereby defining the end wall portions 102, 108, side wall portions 114, 120, and floor portion 126, which is surrounded by the end wall portions 102, 108 and side wall portions 114, 120. In some embodiments the sheet member 100 can be folded without any treatment of the material of the sheet member 100 along lines 106, 112, 118, 124. In some embodiments the material of the sheet member 100 can be weakened, such as by scoring or crimping the sheet member 100 along these lines 106, 112, 118, 124 in order to facilitate folding and raising the first and second end wall portions 102, 108 and the first and second sidewall portions 114, 120 relative to the floor portion 126 of the sheet member to create end walls and sidewalls around the floor portion 126.

Figure 2:
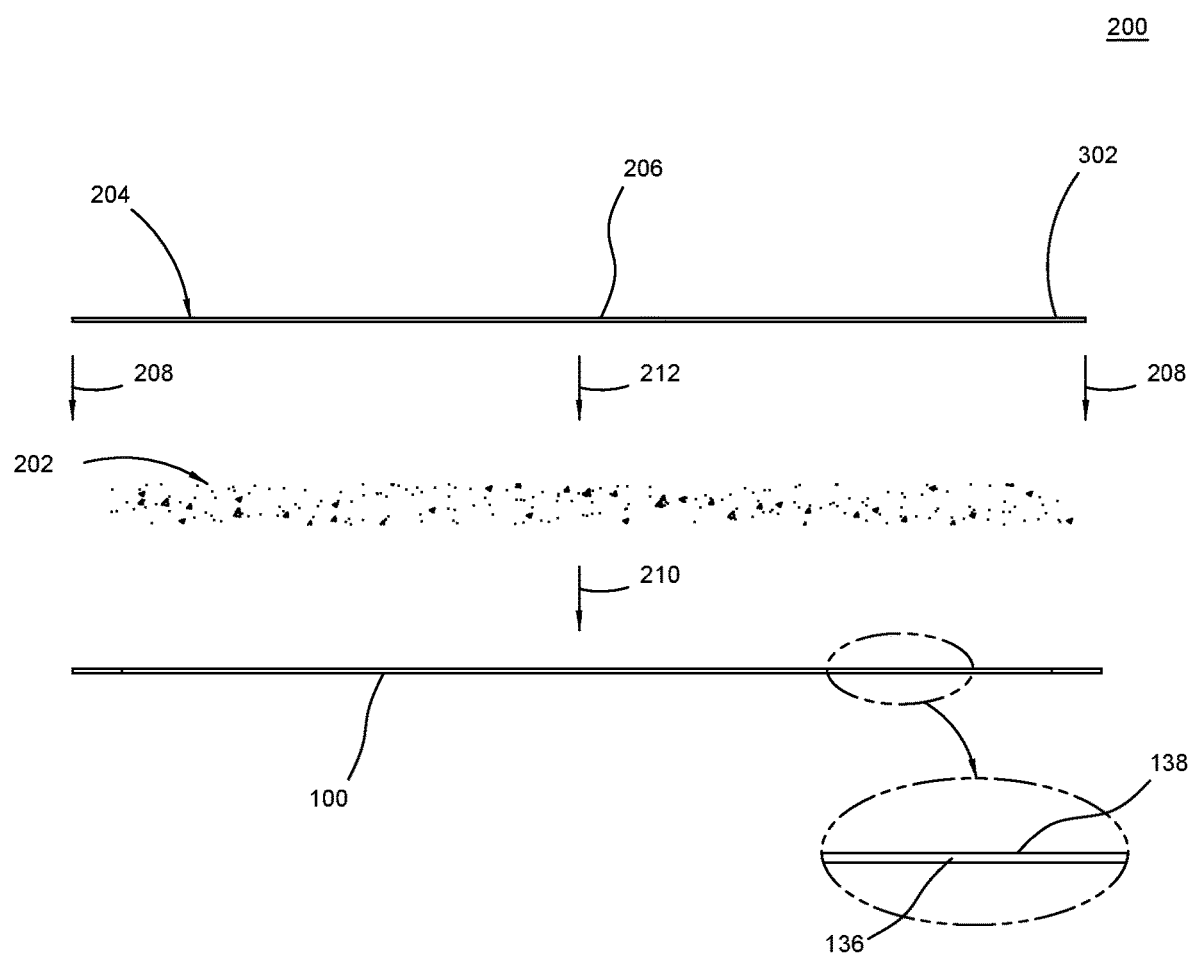
FIG. 2 is an exploded side view of a disposable pet tray assembly, in accordance with some embodiments.
Figure 3:
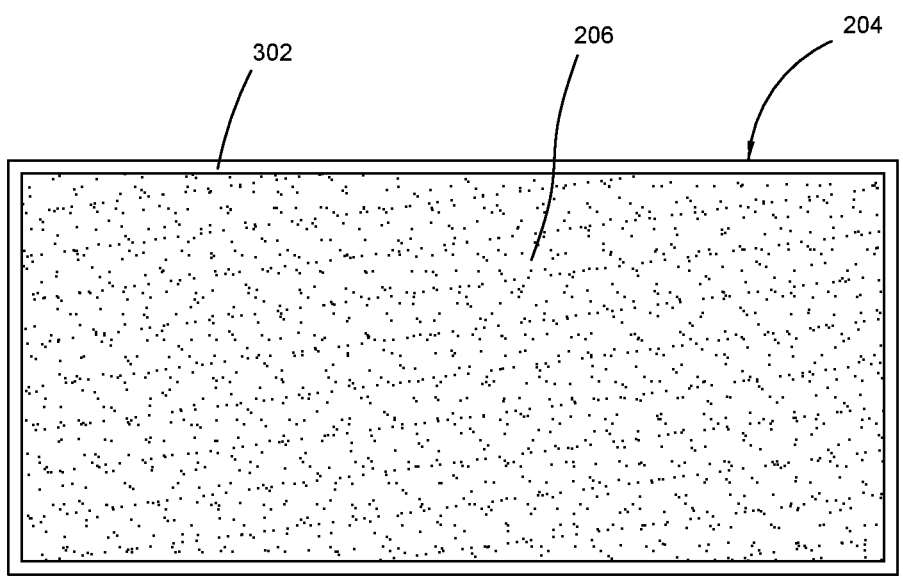
FIG. 3 is an overhead plan view of a retention film for a disposable pet tray, in accordance with some embodiments.

FIG. 2 is an exploded side view 200 of a disposable pet tray assembly, in accordance with some embodiments. A layer of pet material 202 is disposed over the top of the sheet member 100, and over the floor portion 126. The layer of pet material 202 can be comprised of any number of suitable particulate materials, including pet litter made of clay, charcoal, sawdust, sand, fibrous pellets, to name a few materials, and mixtures of such materials. Pet food can alternatively be provided as the pet material. A retention film 204 is disposed over, and around the layer of pet material 202, and adhered to the top surface of the sheet member around the layer of pet material 202 to hold the layer pet material 202 to the sheet member 100. The layer of pet material 202 is placed on the floor portion 126 of the sheet member, as indicated by arrow 210, and the retention film 204 is placed over the layer of pet material 202 such that the perimeter 302 of the retention file 204 is positioned around the layer of pet material 202 and adhered to the top surface of the sheet member 100, as indicated by arrows 208. A main portion 206 of the retention film 204 is over and against the layer of pet material 202. The retention film 204 can be made of a biodegradable material that is moisture impervious to keep the pet material 202 dry and or sterile prior to use. In some embodiments the retention film 204 can be a plastic material, and the retention film can be transparent or opaque. FIG. 3 is an overhead plan view of a retention film 204 for a disposable pet tray. The perimeter 302 is treated with an adhesive material that adheres to the top surface of the sheet member 100. At the inset it is shown that the top surface of the sheet member 100 is treated with fluid barrier 138, such as a wax or plastic material such as polylactic acid (PLA), which prevents liquid from being absorbed by the sheet member 100.

Figure 4:
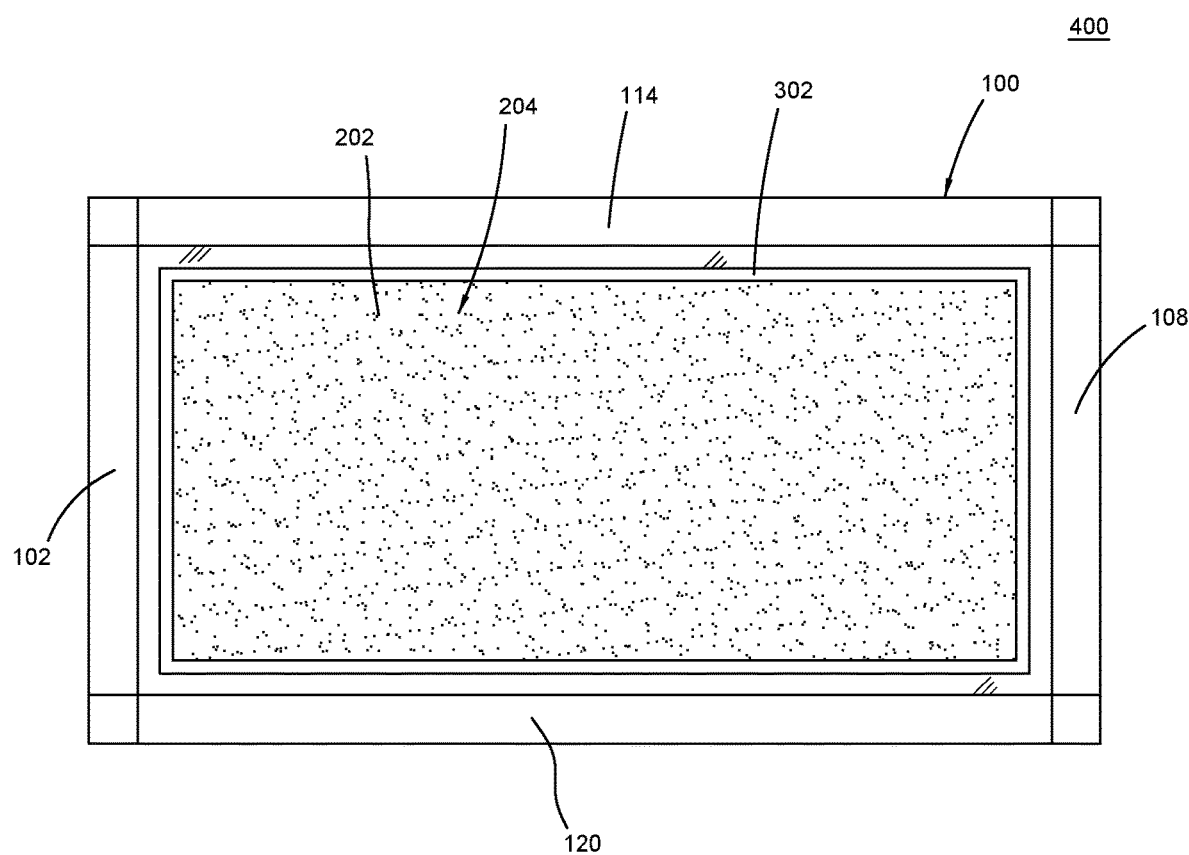
FIG. 4 is an overhead plan view of a disposable pet tray assembly including a layer of pet material and a retention film holding the pet material to the sheet member, and with the sheet member in a flat state, in accordance with some embodiments.
Figure 5:
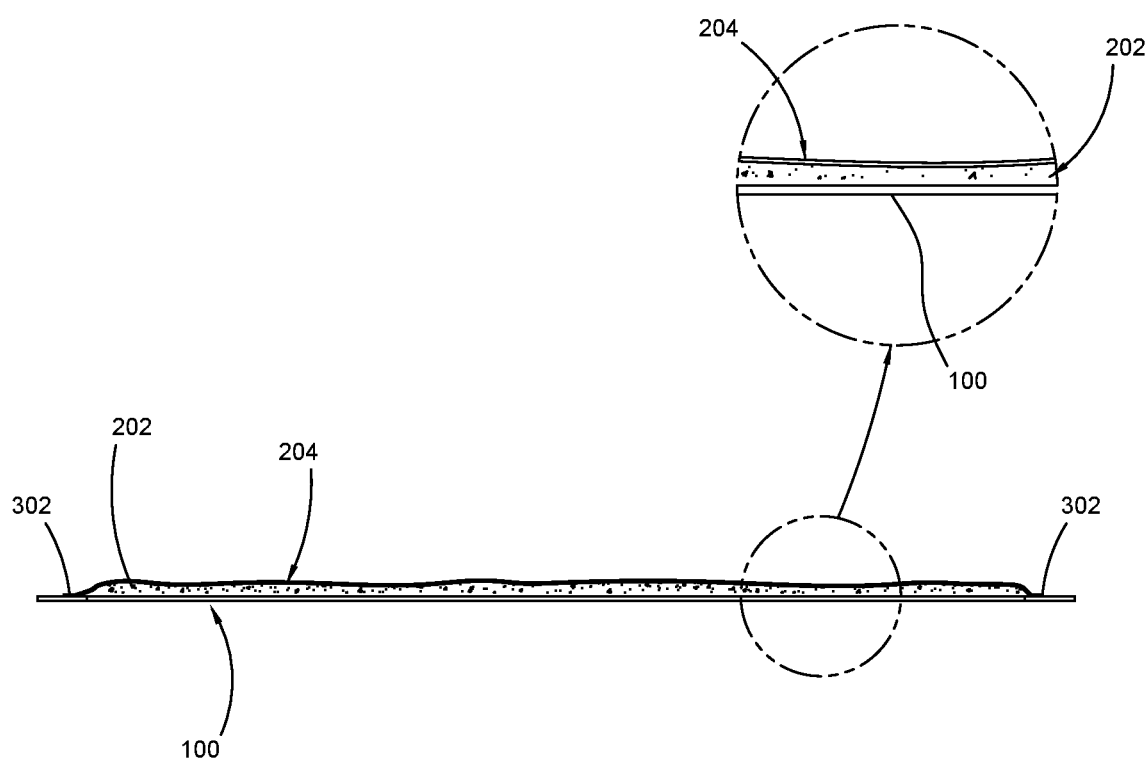
FIG. 5 is a side elevational view of a disposable pet tray assembly including a layer of pet material and a retention film holding the pet material to the sheet member, and with the sheet member in a flat state, in accordance with some embodiments.

FIG. 4 is an overhead plan view 400 of a disposable pet tray assembly including a layer of pet material 202 and a retention film 204 holding the pet material 202 to the sheet member 100, and with the sheet member 100 in a flat state, in accordance with some embodiments. The perimeter of the retention film 302 is adhered to the top surface of the sheet member 100 around the pet material 202, sealing the pet material 202 in place on the sheet member 100. In FIG. 5, which shows a side elevational view of the disposable pet tray assembly of FIG. 4 it can be seen that, even with the layer of pet material 202, the assembly is relatively flat. The layer of pet material 202 can have a loose height from the top surface of the sheet member 100 to the retention film 204 of about five to twenty five millimeters in some embodiments, and more or less in other embodiments.

Figure 6A:
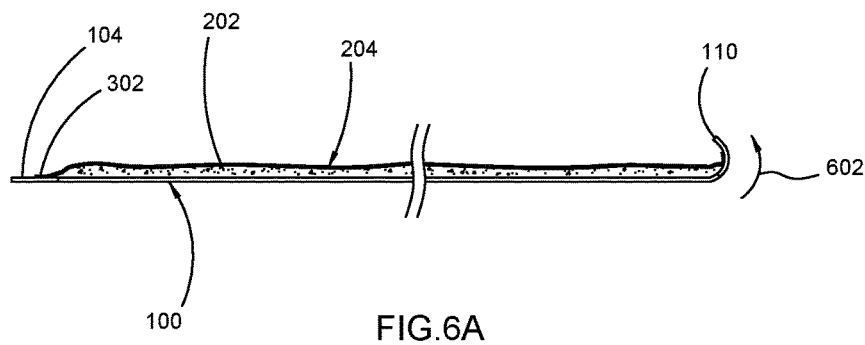
FIGS. 6A & 6B show a sequence of rolling a disposable pet tray assembly, in accordance with some embodiments.
Figure 6B:
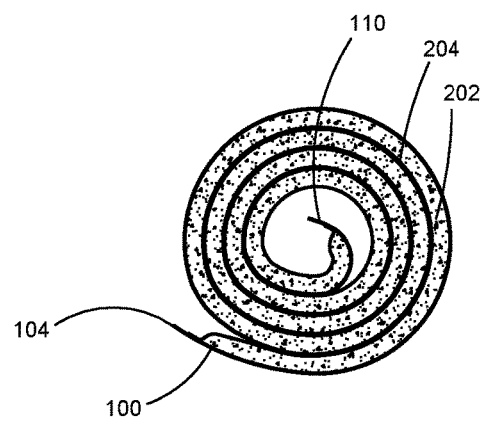
Figure 6C:
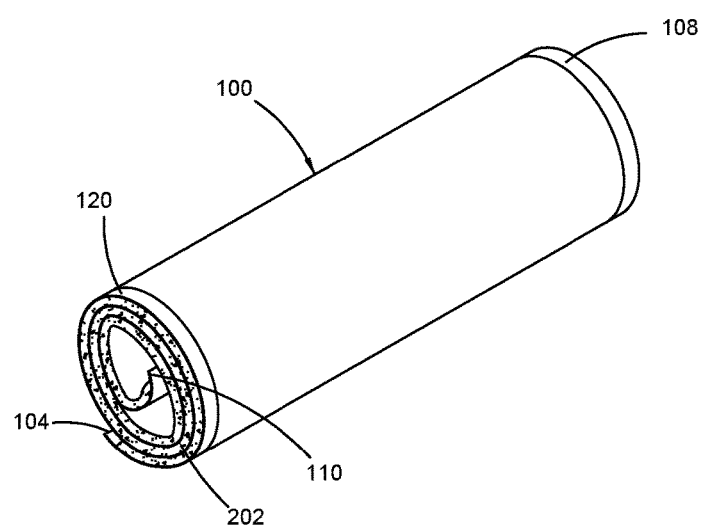
FIG. 6C shows a perspective view of a rolled disposable pet tray, in accordance with some embodiments.

FIGS. 6A & 6B show a sequence of rolling a disposable pet tray assembly, in accordance with some embodiments. In FIG. 6A the assembly is laid relatively flat as shown, for example, in FIG. 5. The second end 110 is then lifted up and over the assembly, as indicated by arrow 602. This motion is continued to roll the entire assembly into a spiral roll as shown in FIG. 6B where the second end 110 is in the interior of the roll and the first end is at the exterior of the roll. Of course, the assembly could be rolled in the opposite direction at the first end 104, or it can be rolled from side to side (e.g. from first side 116 to second side 122 or vice versa). The assembly can be rolled as shown in FIG. 6B for travel, shipping, selling, or storing, and then unrolled for use. FIG. 6C shows a perspective view of the rolled disposable pet tray. The end wall portions 102, 108 and sidewall portions 114, 120, as shown here, can be left in the position shown in FIG. 1 where they are unfolded and extending outward from, and coplanar with the floor portion 126, or they can be folded over the floor portion 126 (and pet material 202 and retention film 204) prior to rolling, in which case the pet material 202 would not be seen from the end of the roll as shown here. However, folding the wall portions 102, 108, 114, 120 over the floor portion 126 and then rolling the assembly can result in deformation of the sidewall portions 114, 120 as the top or outer edge of those portions will be a different radius from the center of the spiral roll that the bottom of those portions where they meet the floor portion 126 if the layer of pet material 202 has a substantial height and they extend over the pet material 202. To alleviate that, the pet material can be located away from the sides so that the end wall portions 102, 108 and sidewall portions 114, 120 can lay flat against the floor 126.

Figure 13:
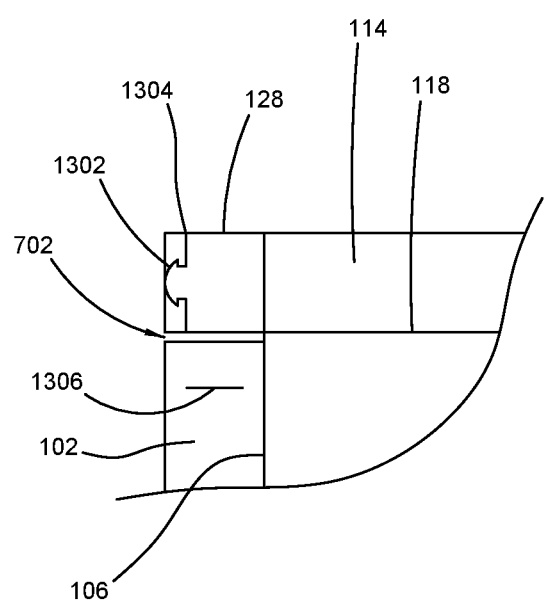
FIG. 13 show a detail of a tab for joining a sidewall portion with an end wall portion of a sheet member for a disposable pet tray, in accordance with some embodiments.
Figure 15A:
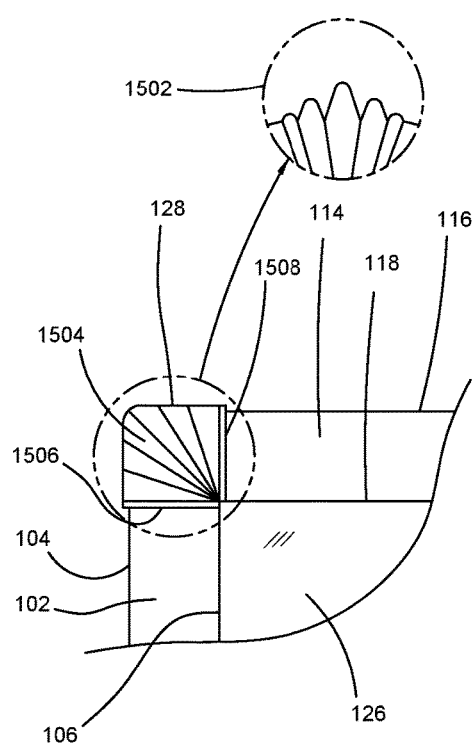
FIGS. 15A-15B show the use of corrugated corner sections, in accordance with some embodiments.
Figure 15B:
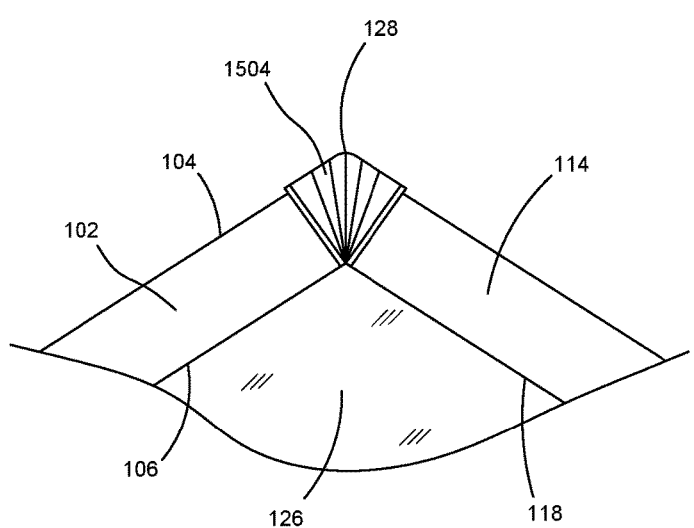

After unrolling the assembly and raising end wall portions 102, 108 and sidewall portions 114, 120, the corner sections 128, 130, 132, and 134 must be attended to. The corner sections 128, 130, 132, and 134 can be configured in several different formats. As examples, in FIGS. 7A, 7B, and 8 the corner sections are formed as tabs that can be stuck to adjacent sidewall sections. FIG. 13 shows one embodiment where the corner sections are formed as tabs that have an interlocking feature. FIGS. 15A-15B show one embodiment for forming corners at the intersection of the end wall and sidewall portions in which the corners are formed as corrugated sections to minimize the mount of assembly needed.

Figure 7A:
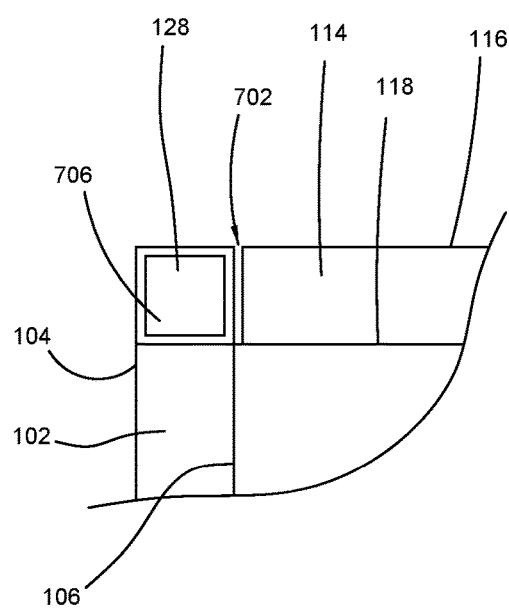
FIGS. 7A & 7B show alternatives for forming tabs at the intersection of the end wall and sidewall portions, in accordance with some embodiments.
Figure 7B:
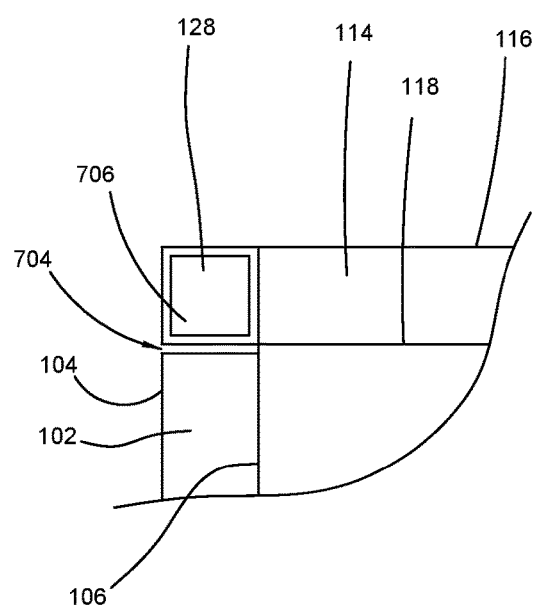
Figure 8:
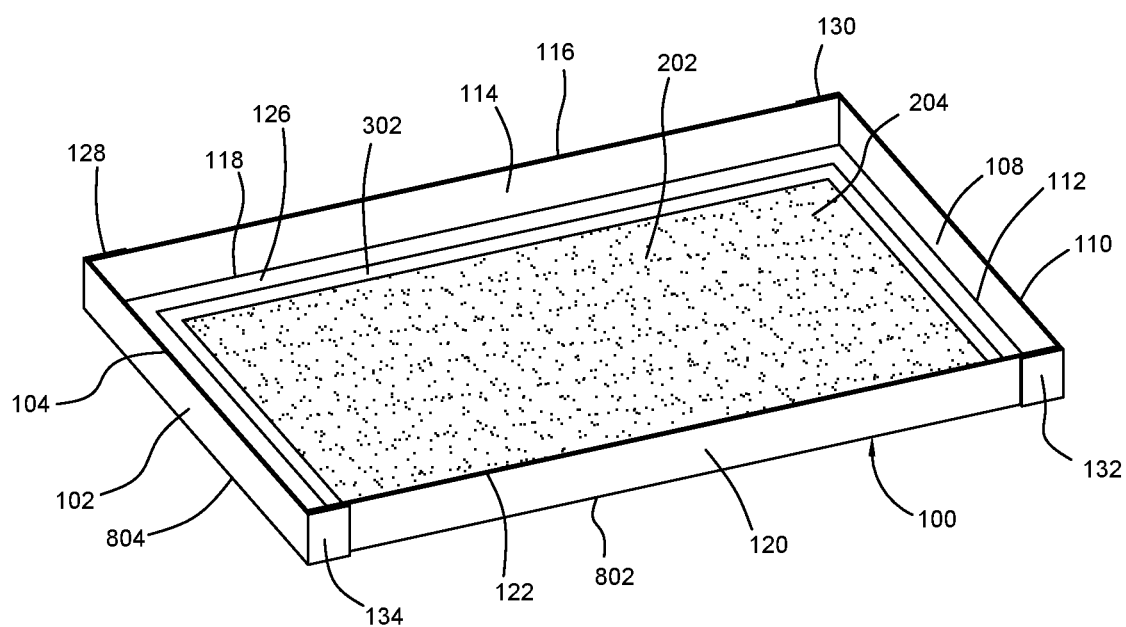
FIG. 8 shows an unrolled and assembled disposable pet tray with the end walls and sidewalls raised and joined, in accordance with some embodiments.

As shown in FIGS. 7A-7B, the corner sections 128, 130, 132, and 134 are formed at the corners of the sheet member 100 where the first and second end wall portions 102, 108 intersect with the first and second sidewall portions 114, 120. The corner sections 128, 130, 132, and 134 in FIGS. 7A-7B can be created by forming cuts, such as either cuts 702 or 704, from the side 116 to the first side line 118, or from the first end 104 to the first end line 106, respectively, which allow the first and second end wall portions 102, 108 to be raised independent of the first and second sidewall portions 114, 120. Raising the first and second end wall portions 102, 108, and the first and second sidewall portions 114, 120 create a continuous wall around the floor portion 126 of the sheet member to contain the pet material and creates lower edges such as lower edges 802, 804 along the side lines and end lines. The corner sections 128, 130, 132, and 134 join the first and second end wall portions 102, 108 to the first and second sidewall portions 114, 120, thereby holding the first and second end wall portions 102, 108 to the first and second sidewall portions 114, 120 in the raised position. The assembled disposable pet tray using the tabbed corner sections of FIGS. 7A-7B is shown in FIG. 8 in a perspective view. In FIG. 8, the first and second end wall portions 102, 108 and the first and second sidewall portions 114, 120 are each raised to be at substantially a right angle to the floor portion 126 of the sheet member 100. In some embodiments the corner sections 128, 130, 132, and 134 can include an adhesive portion that is covered by a removable liner such as liner 706. The liner can be removed to expose the adhesive and then pressed against the adjacent end wall portion or sidewall portion to adhere the sidewall portion to the adjacent end wall portion.

Alternatively, FIG. 13 shows a tab a slot arrangement in which a tab 1302 is formed by a cut (score or perforations) along line 1304. The tab 1302, upon raising the first sidewall portion 114 and the first end wall portion 102, is passed through a slot 1306 cut into the first end portion 102. The tab 1302 has a portion that is longer than the length of the slot 1306 to create an interference that retains the tab 1302 in the slot 1306.

In FIGS. 15A and 15B the corner sections 128, 130, 132, and 134 are shown to be corrugated like an accordion or folding hand held fan. In FIG. 15A an inset 1502 shows an edge view of corner section 128. The material in the corner section 128 is alternately crimped up and down to form the corrugation pattern. The corrugation pattern 1504 can be generally radial such that the line of each crimp changes angle between end wall section 102 and side wall section 114. In fact end wall section 102 can end at a crimp 1506 that defines a boundary between end wall section 102 and corner section 128, and which runs at a right angle to the direction of end lines 104, 106, along end line 118. Similarly, a crimp 1508 can define the boundary between side wall 114 and corner section 128, and run perpendicular to end lines 116, 118, along end line 106. Thus, in FIG. 15A the crimps are present, but the sections but unfolded. In FIG. 15B the end wall 102 and sidewall 114 are raised to be perpendicular to the floor 126, and the corner section 128 is shown with portions of the corrugation pattern 1504 folded such as when the bellows of an accordion is closed or compressed. Corner sections 130, 132, 134 can be formed the same way as corner section 128. Thus, each of the corner sections 128, 130, 132, 134 can be crimped using multiple crimps or folds that alternate in direction from one fold/crimp to the next, producing a corrugated pattern such as the bellows of an accordion or the wall of a paper muffin cup when the end wall and side wall portion are raised.

Figure 9A:
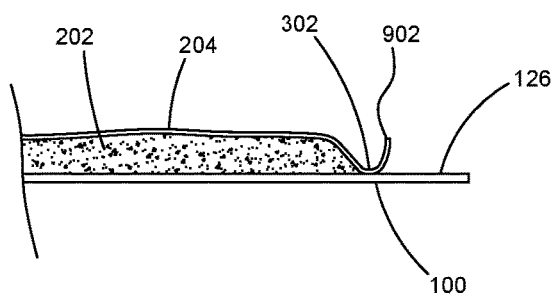
FIGS. 9A & 9B show side sequence views of removing the retention film from the disposable pet tray assembly to reveal the pet material for use by a pet, in accordance with some embodiments.
Figure 9B:
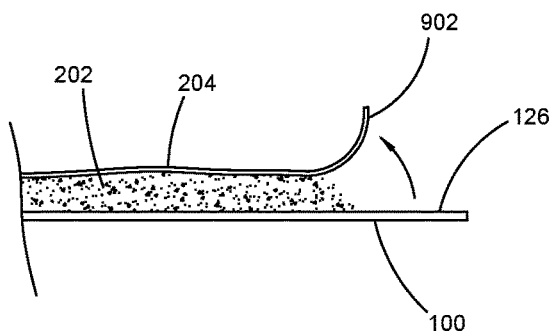

FIGS. 9A & 9B show side sequence views of removing the retention film 204 from the disposable pet tray assembly to reveal the pet material 202 for use by a pet, in accordance with some embodiments. After the disposable pet tray assembly is unrolled and the various end wall and sidewall portions raised and joined as shown in FIG. 8, the retention film 204 can be removed. The adhesive used to join the retention film 204 to the floor portion 126 of the sheet member 100 can be a low tack adhesive that allows the retention film 204 to be removed from the sheet member 100 by simply pulling on the retention film 204. To facilitate removal of the retention film 204, the retention film 204 can be provided with the pull tab 902 that extends beyond the perimeter 302 and is not adhered to the floor 126 of the sheet member 126. Accordingly, in FIG. 9B, the pull tab 902 is pulled up to separate the retention film 204 from the sheet member 100, thereby exposing the pet material 202 so that a pet can use the pet material 202.

Figure 10:
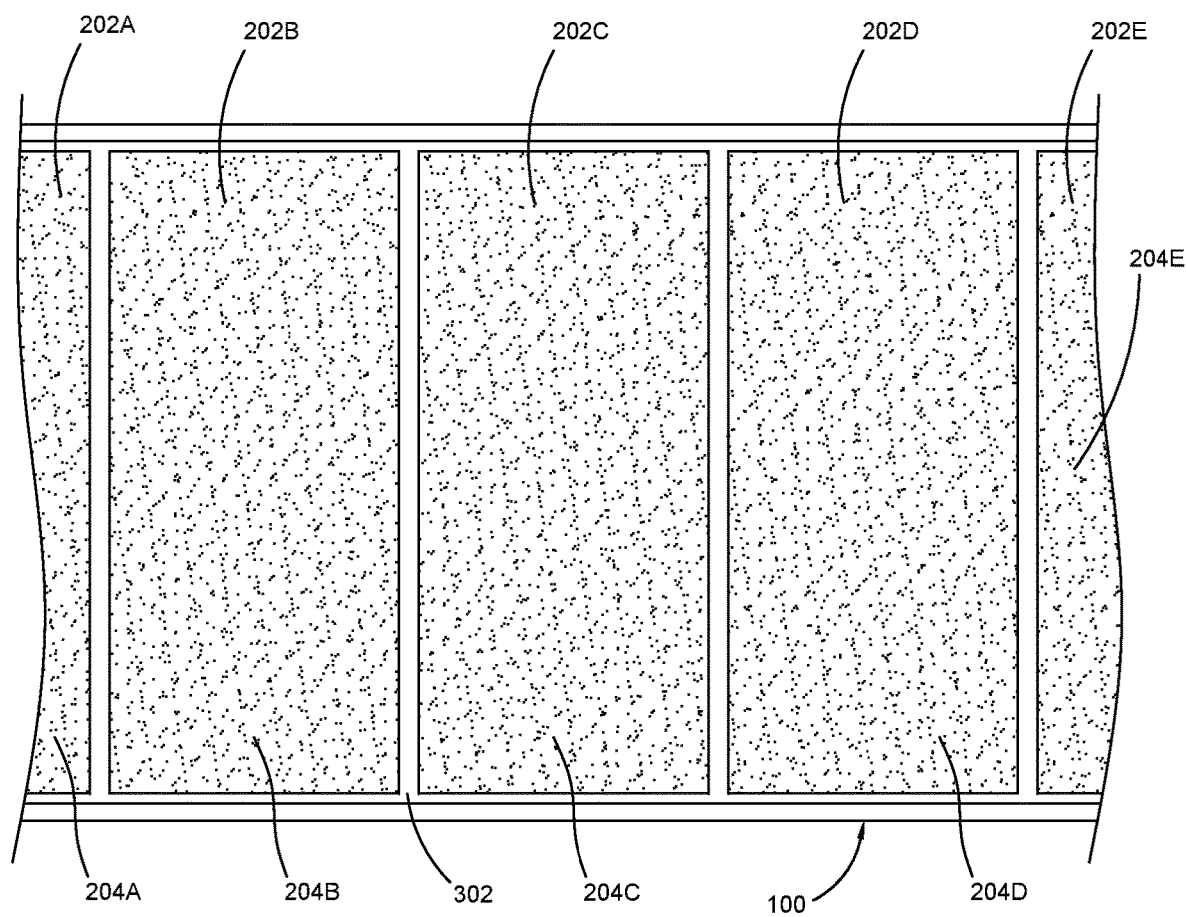
FIG. 10 shows an overhead plan view of a disposable pet tray in which the pet material is grouped into sections and the retention film is adhered to the sheet member between sections of pet material, in accordance with some embodiments.

FIG. 10 shows an overhead plan view of a disposable pet tray in which the pet material is grouped into sections and the retention film is adhered to the sheet member between sections of pet material, in accordance with some embodiments. It is contemplated that, to provide a sufficient amount of pet material without the mass of the pet material potentially causing the retention film 204 from separating unintentionally from the sheet member, the pet material can be grouped into two or more portions such as portions 202A, 202B, 202C, 202D, 202E, and the retention film is further adhered to the sheet member between these portions 202A, 202B, 202C, 202D, 202E, resulting in corresponding portions 204A, 204B, 204C, 204D, and 204E. By providing additional regions where the retention film 204 is adhered to the sheet member 100 the height of the pet material layer 202 can be increased to have a total increased amount of pet material compared to embodiments where only the perimeter of the retention film 204 is adhered to the sheet member 100.

Figure 11A:
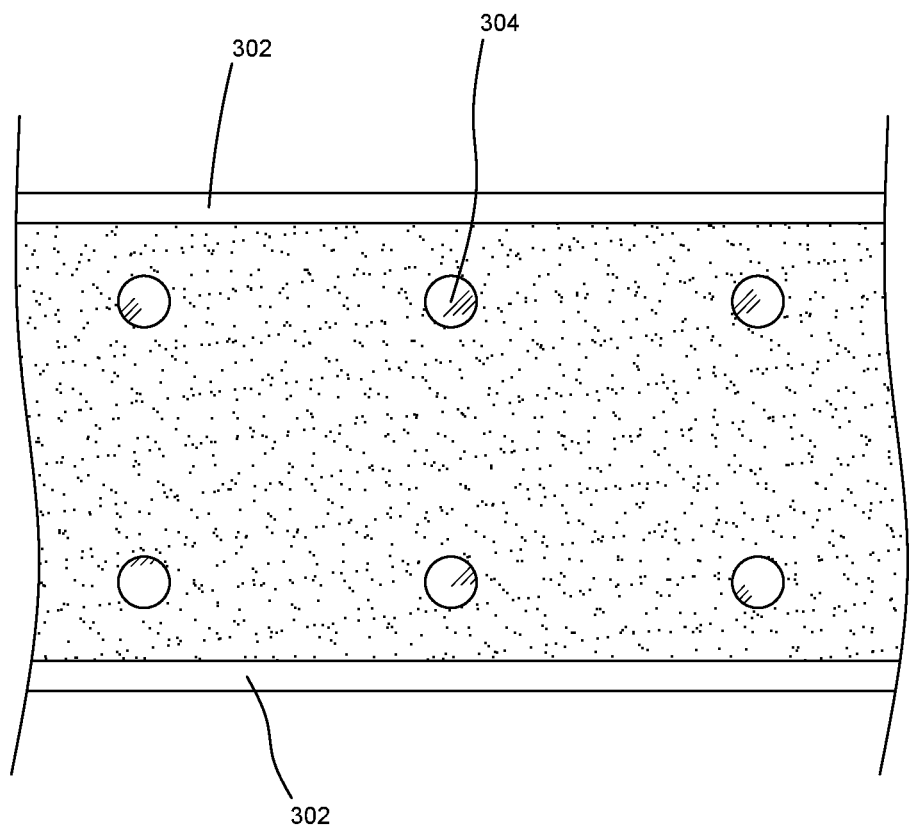
FIG. 11A shows an overhead plan view of a disposable pet tray in which the retention film is also adhered to the sheet member in holes in the layer of pet material, in accordance with some embodiments.
Figure 11B:
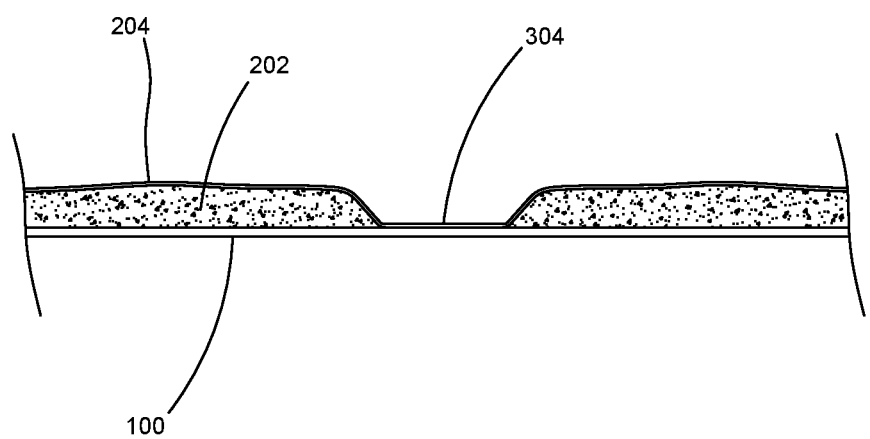
FIG. 11B shows a side view cross sectioned view with the section plane passing through a hole in the layer of pet material, in accordance with some embodiments.

FIG. 11A shows an overhead plan view of a disposable pet tray in which the retention film 204 is also adhered to the sheet member 100 in holes 304 in the layer of pet material 202, in accordance with some embodiments. As an alternative to the arrangement of FIG. 10, here the pet material 202 is arranged with holes or openings in the layer of pet material 202 to allow the retention film 204 to be adhered to the sheet member 100 in these holes 304 in addition to the perimeter 302 of the retention film 204 being adhered to the sheet member 100. FIG. 11B shows a side cross sectioned view with the section plane passing through a hole 304 in the layer of pet material 202, with the retention film 204 adhered to the sheet member 100 in the hole 304.

It will be appreciated by those skilled in the art that a variety of patterns such as those shown in FIGS. 10, 11A, and 11B can be used to apportion the pet material and/or to ensure connection of the film 205 to the floor 126. The examples shown in these drawings are not meant to be limiting, but rather to illustrate that different patterns can be used. Other pattern will occur to those skilled in the art that are equivalent to those shown here.

Figure 12:
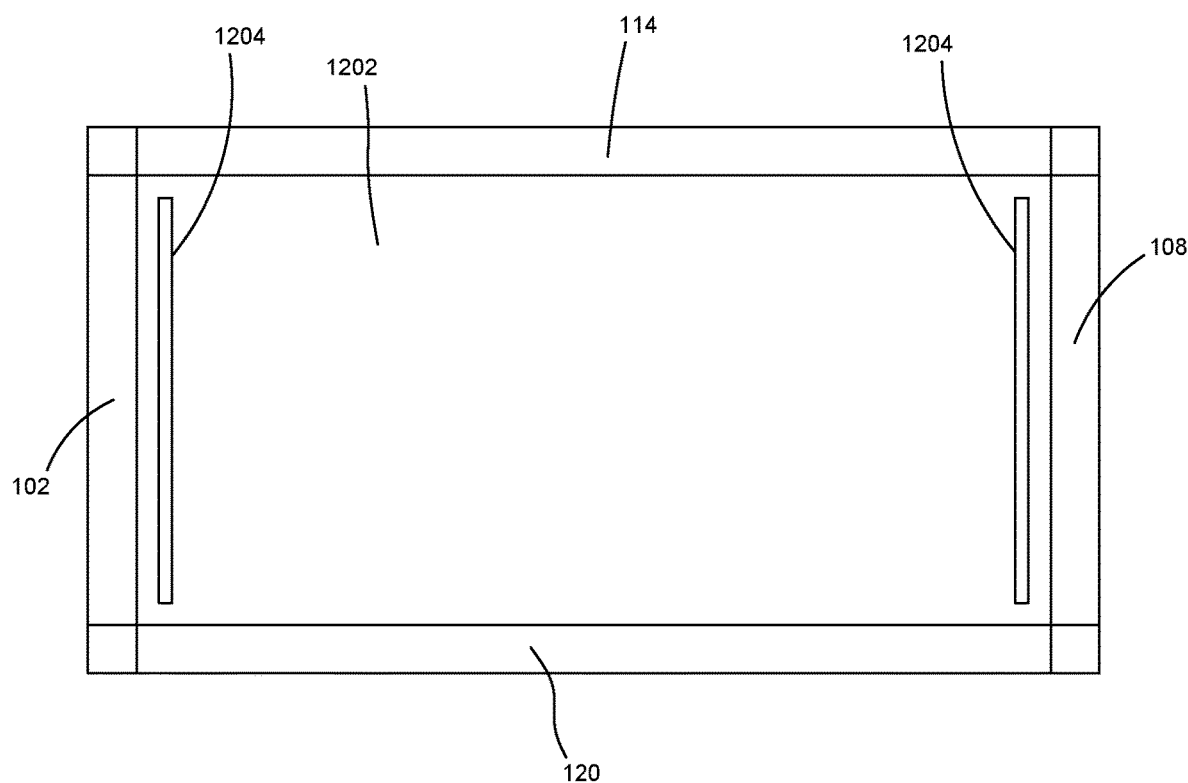
FIG. 12 shows the bottom of a sheet member having adhesive strips or portions to adhere the sheet member to a surface, in accordance with some embodiments.

FIG. 12 shows the bottom 1202 of a sheet member 100 having adhesive strips or portions 1204 to adhere the sheet member to a surface, in accordance with some embodiments. The adhesive strips 1204 can be comprised of a low tack adhesive such as a pressure sensitive adhesive and covered with a removable liner. A user can remove the liners and press them against a surface, such as a floor, to hold the disposable pet tray in place, and keep it from rolling up due to any memory effect of the sheet member 100 having been rolled up. The adhesive strips 1204 can be used in implementations where the unfolding of the end and side walls may not be sufficient to keep the floor 126 unrolled once it is unrolled for use. It is contemplated that the stiffness of the end and side walls will, in some implementations, prevent a memory effect of the floor material from rolling itself back up, but adhesive strips 1204 are one example of way to prevent that from occurring. Other equivalent means will occur to those skilled in the art which do not substantially depart from the spirit of the inventive disclosure.

Figure 14:
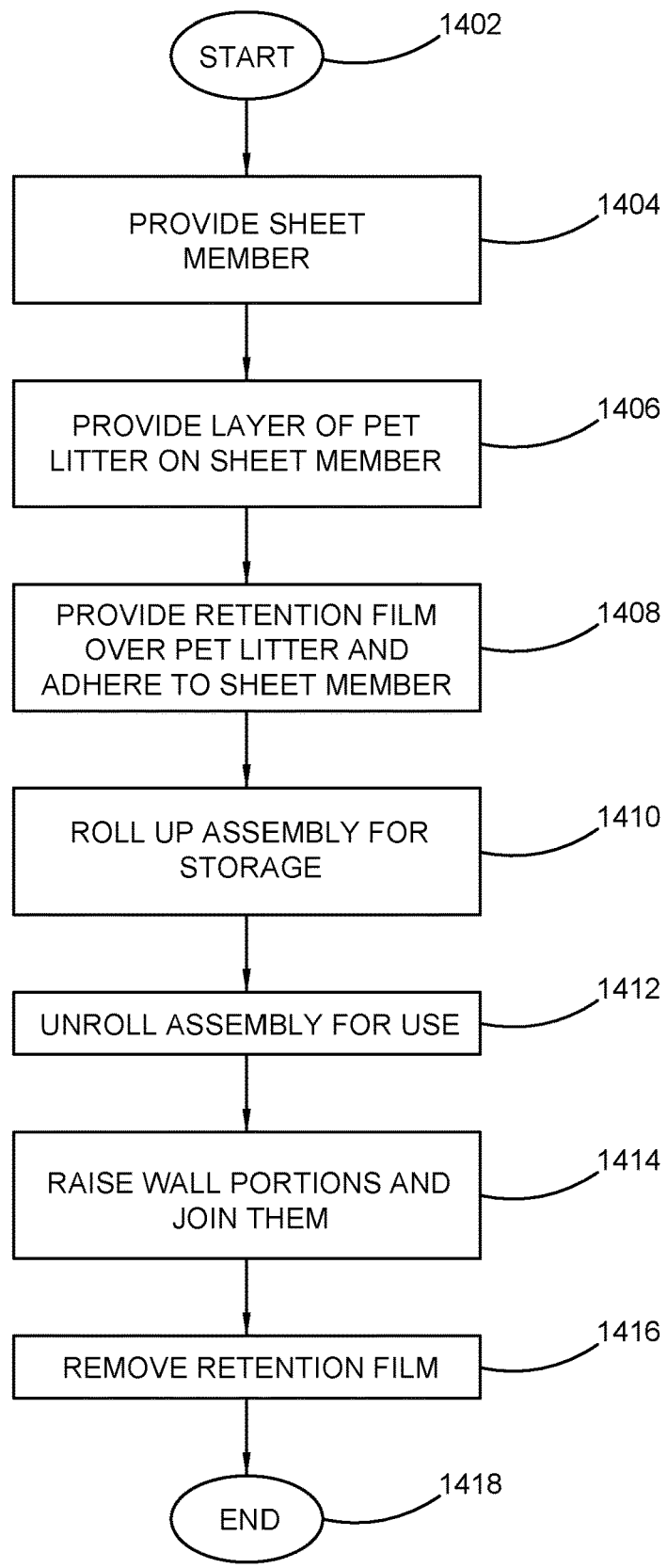
FIG. 14 is a flow chart diagram of a method for creating, storing, and using a disposable pet tray, in accordance with some embodiments.

FIG. 14 is a flow chart diagram of a method for creating, storing, and using a disposable pet tray, in accordance with some embodiments. At the start 1402 the various materials are collected for assembly. In step 1404 the sheet member is provided, including the defined end wall and sidewall portions, tabs, and end and side lines. In step 1406 a layer of pet material is provided on the floor portion of the sheet member, and in step 1408 the retention film is provided over the pet material and adhered to the sheet member around the pet material. In step 1410 the flat sheet member with the pet material and retention film are rolled up into a spiral roll for storage, or for transportation or travel. In step 1412 the rolled disposable pet tray assembly is unrolled, and in step 1414 the various wall portions are raised. Then in step 1416 the retention film is removed to allow the pet material to be accessible by a pet and the method ends 1418.

A disposable pet tray has been disclosed that allows for the efficient storage, transport, and travel with a pet, of one or more of the disposable pet trays. Conventional trays or pans are rigid and can be heavy, bulky, and cumbersome for travel, and are therefore inconvenient for travel with a pet. By rolling the disposable pet tray, it can be stored in a smaller space, and several of them can be stored in the effective space occupied by a conventional pet tray. The disclosure provides a flexible but non-collapsible substrate as a sheet member on which wall portions and a floor portion are defined, and a layer of pet material is disposed on the floor portion and held in place by a removable retention film. Once assembled, the disposable pet tray assembly can be rolled up for travel, shipping, sale, and/or storage. When needed, it can then be unrolled, the wall portions raised, and the retention film removed to allow a pet to access the pet material. After use the disposable pet tray can be appropriately disposed.

The claims appended hereto are meant to cover all modifications and changes within the scope and spirit of the present invention.

What is claimed is:

1. A disposable pet tray, comprising:
   a sheet member having:
      a first end wall portion defined at a first end of the sheet member;
      a second end wall portion defined at a second end of the sheet member opposite the first end;
      a first sidewall portion defined along a first side of the sheet member from the first end to the second end of the sheet member;
      a second sidewall portion defined along a second side of the sheet member, opposite the first side, and from the first end to the second end of the sheet member;
      a floor portion that is bounded by the first end wall, second end wall, first sidewall, and second sidewall;
      wherein the sheet member comprises lines formed between the floor portion and the first end wall portion, second end wall portion, first sidewall portion, and second sidewall portion, wherein the lines facilitate folding of the first end wall portion, second end wall portion, first sidewall portion, and second sidewall portion relative to the floor portion;
   a layer of pet material disposed on a top surface of the sheet member and on the floor portion; and
   a retention film disposed over the layer of pet material and adhered to the sheet member on the floor portion around a perimeter of the layer of pet material to retain the layer of pet material in place on the floor portion, the retention film being moisture impervious and configured to be removed from the floor portion to expose the layer of pet material for use by a pet;
   wherein, when in a stored position before use, the sheet member is configured in a roll with the layer of pet material and retention film in a spiral, wherein the first end is at an interior of the roll and the second end is on an exterior of the roll; and
   in a use configuration, the roll is unrolled such that the floor portion is flat, and the first end wall, second end wall, first side wall, and second sidewall are each raised at substantially a right angle to the floor portion.

2. The disposable pet tray of claim 1, wherein the sheet member is comprised of paper stock coated with a layer of polylactic acid on top surface of the sheet member against which the pet material is held.

3. The disposable pet tray of claim 1, wherein the layer of pet material is divided into at least two portions, the retention film is adhered to the sheet member between the at least two portions.

4. The disposable pet tray of claim 1, wherein the retention film is further adhered to the sheet member at a plurality of holes in the layer of pet material where the pet material surrounds each of the plurality of holes.

5. The disposable pet tray of claim 1, wherein:
   the first end wall portion is defined by a first end crease across the sheet member parallel with and proximate to the first end;
   the second end wall portion is defined by a second end crease across the sheet member parallel with and proximate to the second end;
   the first sidewall portion is defined by a first side crease across the sheet member parallel with and proximate to the first side; and
   the second sidewall portion is defined by a second side crease across the sheet member parallel with and proximate to the second side.

6. The disposable pet tray of claim 1, wherein:
   the first end wall portion is defined a first end score line across the sheet member parallel with and proximate to the first end;
   the second end wall portion is defined by a second end score line across the sheet member parallel with and proximate to the second end;
   the first sidewall portion is defined by a first side score line across the sheet member parallel with and proximate to the first side; and
   the second sidewall portion is defined by a second side score line across the sheet member parallel with and proximate to the second side.

7. The disposable pet tray of claim 1, wherein the first and second sidewall portions intersect with first end wall portion at the first end and the second end wall portion at the second end at corners of the sheet member to define tab portions at the first end and the second that connect the first and second sidewall portions to the first and second end wall portions when the disposable pet tray is in the use configuration.

8. The disposable pet tray of claim 1, further comprising:
   a first adhesive portion proximate to the first end on a bottom surface of the floor portion;
   a first removable liner disposed over the first adhesive portion;
   a second adhesive portion proximate to the second end on the bottom surface of the floor portion; and
   a second removable liner disposed over the second adhesive portion.

9. The disposable pet tray of claim 1, wherein the first and second sidewall portions intersect with first end wall portion at the first end and the second end wall portion at the second end at corner sections of the sheet member, and wherein each of the corner sections are crimped in an alternating pattern.

10. The disposable pet tray of claim 1, wherein the layer of pet material is one of pet litter or pet food.

11. The disposable pet tray of claim 1, wherein the retention film further having a pull tab configured to facilitate removal of the retention film from the sheet member to expose the layer of pet material, wherein the pull tab formed by a portion of the retaining film that extends beyond the perimeter and is not adhered to the floor portion.

12. A disposable pet tray, comprising:
   a sheet member having:
      a first end wall portion defined at a first end of the sheet member;
      a second end wall portion defined at a second end of the sheet member opposite the first end;
      a first sidewall portion defined along a first side of the sheet member from the first end to the second end of the sheet member;
      a second sidewall portion defined along a second side of the sheet member, opposite the first side, and from the first end to the second end of the sheet member;
      a floor portion that is bounded by the first end wall, second end wall, first sidewall, and second sidewall;
      wherein the first end wall portion, second end wall portion, first sidewall portion, and second sidewall portion are foldable relative to the floor portion;
   a layer of pet material disposed on a top surface of the sheet member and on the floor portion; and
   a retention film disposed over the layer of pet material and adhered to the sheet member on the floor portion around a perimeter of the layer of pet material to retain the layer of pet material in place on the floor portion, the retention film being moisture impervious and configured to be removed from the floor portion to expose the layer of pet material for use by a pet;

wherein the retention film further having a pull tab configured to facilitate removal of the retention film from the sheet member to expose the layer of pet material, wherein the pull tab formed by a portion of the retaining film that extends beyond the perimeter and is not adhered to the floor portion.

* * * * *